United States Patent [19]
Bankman et al.

[11] Patent Number: 5,574,799
[45] Date of Patent: Nov. 12, 1996

[54] METHOD AND SYSTEM FOR AUTOMATED DETECTION OF MICROCALCIFICATION CLUSTERS IN MAMMOGRAMS

[75] Inventors: Isaac N. Bankman, Columbia; William A. Christens-Barry, Ellicott City, both of Md.

[73] Assignee: The Johns Hopkins University, Baltimore, Md.

[21] Appl. No.: 897,650

[22] Filed: Jun. 12, 1992

[51] Int. Cl.$^6$ .................................................. G06K 9/00
[52] U.S. Cl. ...................... 382/132; 382/224; 382/190; 382/276
[58] Field of Search ........................... 382/6, 1, 16, 22, 382/28; 364/413.01, 413.02, 413.13, 413.14, 413.19; 348/77, 79

[56] References Cited

U.S. PATENT DOCUMENTS

| | | | |
|---|---|---|---|
| 5,079,698 | 1/1992 | Grenier et al. | 382/6 |
| 5,133,020 | 7/1992 | Giger et al. | 382/6 |
| 5,224,036 | 6/1993 | Ito et al. | 382/6 |

OTHER PUBLICATIONS

H. Yoshimura, et al, "Computerized Scheme for the Detection of Pulmonary Nodules", Invest. Radiol., vol. 27, pp. 124–129, Feb. 1992.

Spiesberger, W., "Mammogram Inspection by Computer," IEEE Transactions on Biomedical Engineering vol. BME–26 No. 4, Apr. 1979, pp. 213–219.

*Primary Examiner*—Leo Boudreau
*Assistant Examiner*—D. Richard Anderson
*Attorney, Agent, or Firm*—Francis A. Cooch

[57] ABSTRACT

The invention is a novel method for automated detection of objects in images. One specific use is to detect malignant microcalcification clusters in mammograms. The method operates by forming a contour plot of the image (mammogram), the object (microcalcification) in the contour plot being comprised of a set of nested contour lines wherein the contour lines correspond to intensity levels thereby causing the object to appear as a prominent peak in relation to the local surround in the image.

35 Claims, 3 Drawing Sheets

METHOD AND SYSTEM FOR AUTOMATED DETECTION OF MICROCALCIFICATION CLUSTERS IN MAMMOGRAMS

STATEMENT OF GOVERNMENTAL INTEREST

The Government has rights in this invention pursuant to Contract No. N00039-91-C-0001 awarded by the Department of the Navy.

BACKGROUND OF THE INVENTION

Breast cancer, by far the leading type of cancer incidence in women, causes about 170,000 new cases a year, more than double the amount caused by colorectal cancer, the second major type in women. However, early diagnosis and treatment of breast cancer provide one of the highest chances of survival among cancer types in women. The American Cancer Society recommends a yearly mammogram examination for asymptomatic women over the age of 35 and Medicare covers these procedures.

Awareness and willingness for prevention of breast cancer is rapidly increasing in the general-public. Therefore, it is possible that mammography will soon be one of the highest volume X-ray procedures regularly used in radiology clinics. The increasing burden on radiologists is being experienced at many medical centers. A reliable computerized system can contribute both speed and accuracy to mammogram interpretation.

The first and sometimes the only mammographic sign in early, curable breast cancer is a cluster of microcalcifications that are visible in about 50% of breast cancer cases. Microcalcifications typically have a higher X-ray opacity than that of normal breast tissue and they appear as relatively brighter structures ranging from 0.1 mm to 2 mm in width in a mammogram. In visual inspection, one cluster of microcalcifications consists of 3 or more individual microcalcifications that appear in an area of about 1 $cm^2$.

Due to the subtlety of some microcalcifications, visual interpretation of a mammogram is a tedious process that generally requires a magnifying glass, and that, in some cases, can take more than 15 minutes. In visual inspection, the probability of false negatives is high and a significant level of false positives is reported, i.e., only one out of five cases that radiologists interpret as potential cancer is confirmed in a biopsy examination.

The factors that contribute to the difficulty of visually recognizing microcalcifications are their small size; their morphological variability; their similarity to other microstructures that are unrelated to cancer, e.g., film artifacts, lead shot positioning markers, and some benign tissue structures; and the relatively low contrast of mammograms.

For an automated system, the small size of microcalcifications does not pose a large problem because digitization resolutions (e.g. 25 microns/pixel) that provide adequate information on the smallest microcalcifications are available. However, the other three factors present challenges that successful automated systems have to meet.

Previously developed automated detection techniques reported varying levels of performance with different algorithms. See, H-P Chan et al., "Computer-aided detection of microcalcifications in mammograms: methodology and preliminary clinical study," *Invest Radiol.*, vol. 23, p. 664, 1988; B. W. Fam et al., "Algorithm for the detection of fine clustered calcifications on film mammograms," *Radiology*, vol 169, p. 333, 1988; and D. H. Davies and D. R. Dance, "Automatic computer detection of clustered calcifications in digital mammograms," *Phys. Med Biol.*, vol 35, p. 1111, 1990.

Chan's approach is based on a heuristic signal enhancement filter and local threshold crossing detection and was able to detect 90% of the microcalcification clusters along with a few false positive clusters per mammogram. As Chan states in the conclusion of his article, the detection accuracy was lower than that of an average radiologist, and the radiologist had to rule out the large number of false positives. Better results were reported by Fam and Davies.

The potential difficulties and pitfalls of available automated detection techniques can be summarized as follows:

a. Too little enhancement may preclude the detection of minor microcalcification peaks while too much enhancement may increase significantly the amplitude of small background structures (noise) and thus produce a large number of false detections. An acceptable compromise may not exist in some images, and in those images where it exists, it can change from image to image and can be difficult to determine.

b. A small, square region of analysis (moving kernel) where operational parameters are computed, may be inappropriate for the natural shape of microcalcifications and automated detection based on such approaches may depart considerably, in some cases, from the outcome of visual detection.

c. A large number of parameters whose values have to be entered manually (e.g., Fam) is not a viable approach for expedient clinical use.

Considering the limitations of the methods discussed above, any new detection method has to meet the following requirements:

a. Operation on raw data (no enhancement) to ensure that both visual interpretation and automated detection use the same information.

b. Approach that is compatible with the natural morphology of microcalcifications; no use of small square areas of interest or moving kernels.

c. A minimal number of operational parameters that can be set adaptively and automatically for any image, allowing fully automated operation.

d. Visual interpretability of operational parameters.

The above considerations and the unsatisfactory results obtained with some of the available detection techniques, led to the development of the fundamentally different detection method described and claimed herein.

SUMMARY OF THE INVENTION

The invention is designed as a diagnostic aid that determines, on a digitized mammogram, the location of clusters of microcalcifications whose morphological properties are similar to those observed in malignant microcalcification clusters confirmed by biopsy. The invention accomplishes this by forming a contour plot of the mammogram with each microcalcification being comprised of a set of nested contour lines wherein the contour lines correspond to pixel intensity levels. This causes each microcalcification to appear as a prominent peak in relation to the local surround in the mammogram.

The invention then computes a sequence of contour areas for each set of contour lines progressing from the contour line having the highest intensity level to the contour line having the lowest intensity level. The sequence of contour areas are then used to compute the departure, prominence, and steepness of the peak formed by the set of contour lines.

A microcalcification cluster is detected when three or more peaks occur in a preset area and have values of departure, prominence, and steepness that fall in the corresponding acceptance ranges. Thus, the detection method of the invention satisfies all the requirements set forth above while avoiding the difficulties of the available detection techniques.

For a more complete appreciation of the invention, attention is invited to the following detailed description of a preferred embodiment taken with the figures of the drawings. The scope of the invention, however, is limited only through the claims appended hereto.

DETAILED DESCRIPTION

Figure 1A:
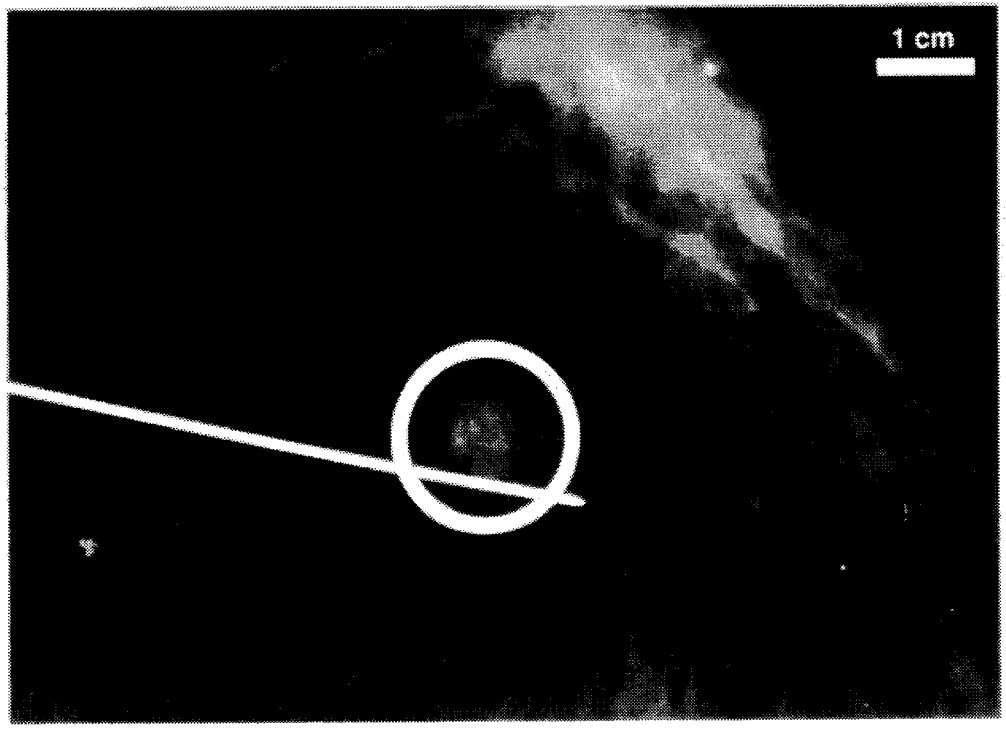
FIG. 1, consisting of FIGS. 1a and 1b, illustrates a microcalcification cluster from a mammogram at two different magnifications.
Figure 1B:
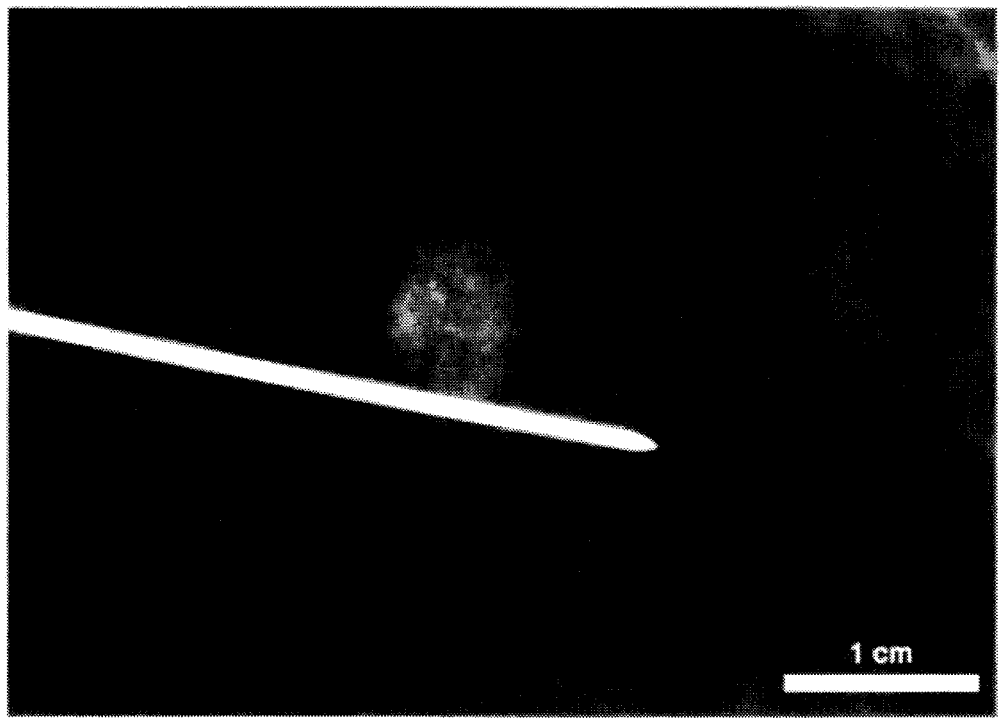
Figure 2A:
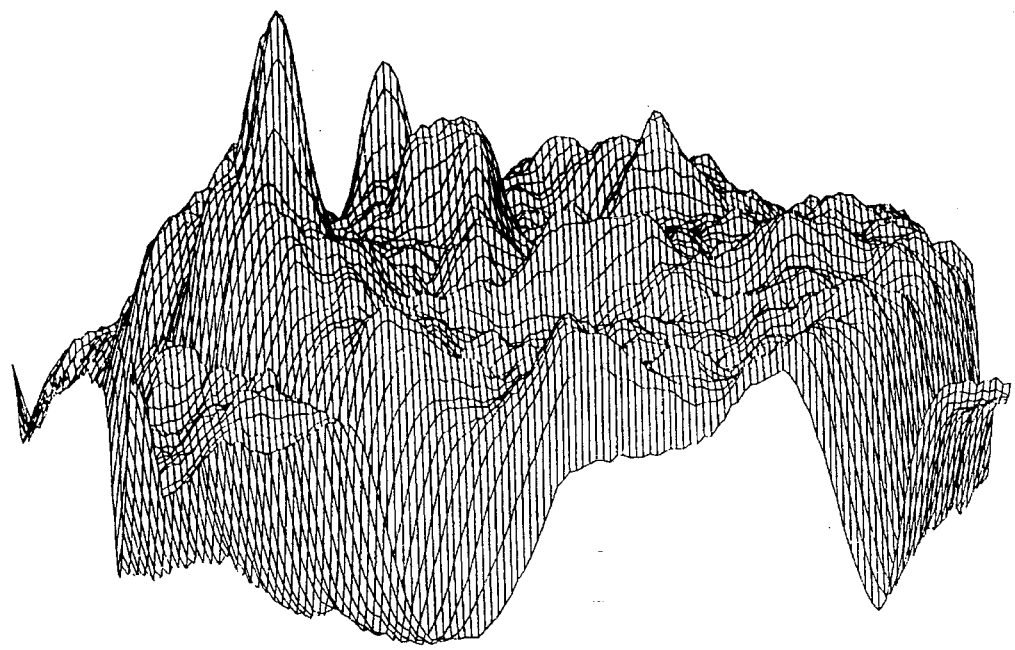
FIG. 2, consisting of FIGS. 2a and 2b, illustrates a 3-D plot and contour plot, respectively, of the cluster shown in FIG. 1.

The strategy of the detection method and system of the invention is to view the image as a landscape where elevation corresponds to intensity (brightness), i.e., the higher the intensity, the higher the elevation. In this perspective, microcalcifications appear as prominent peaks that stand out with respect to the local surround. A mammogram that contains a malignant microcalcification cluster is shown in FIGS. 1a and 1b and the corresponding 3-D plot of the cluster is shown in FIG. 2a.

The inventors' method and system is applied to and uses digitized raw data without any preprocessing. For testing, four mammograms with one cluster of microcalcifications in each were selected. The location of the malignant cluster was indicated by an experienced radiologist and confirmed by a biopsy examination. Mammograms were uniformly illuminated without saturation and were digitized in overlapping segments of 12.8 mm height by 19.2 mm width using a Sony XC-77cc CCD array camera at a spatial resolution of 25 microns/pixel with an 8-bit A/D converter. Segments were overlapped to ensure that each microstructure smaller than 2 mm in width appeared entirely in at least one segment. The spatial resolution used provides about 16 pixels for the smallest microcalcification to be detected (0.1 mm width).

Figure 2B:
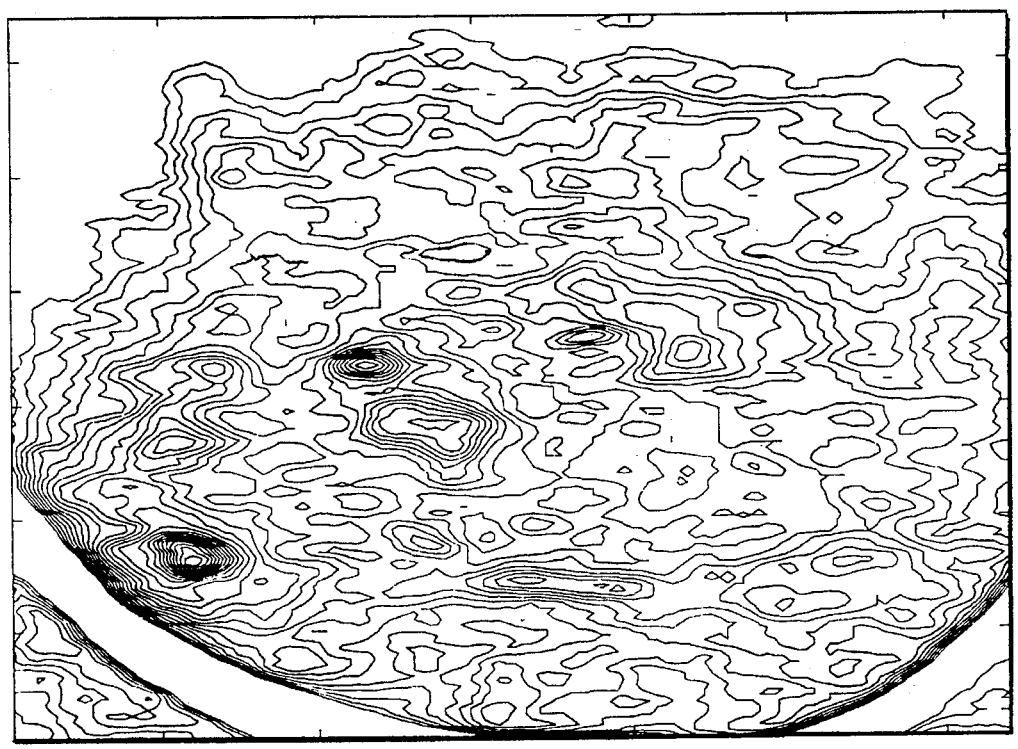

The detection method first determines the largest pixel intensity value u, the lowest pixel intensity value b, and the mean m intensity value of the complete mammogram image. Then a contour plot of the entire image is formed. The contour plot obtained in the vicinity of the cluster of FIGS. 1a and 1b is shown in FIG. 2b. The contour lines referred to are iso-intensity contour lines analogous to iso-elevation contour lines in cartography. Therefore, these contour lines are not obtained by edge detection and do not require local gradient estimates.

Each contour line $c_j$ is made of pixels that have an intensity value equal to or higher than the intensity level $t_j$ of that contour line. Contour lines are obtained at different levels of intensity equally spaced by an amount e that has to be set to a small value, e.g., 5, in order to obtain an informative contour plot. It is also possible to set e adaptively for each image, in proportion to the range of the contour line intensity levels $(t_u, t_b)$. The largest value of $t_j(t_u)$ is set to u-e. For a complete contour plot, the lowest intensity level of $t_j(t_b)$ has to be set to b. However, since microcalcifications typically are bright structures, setting $t_b$ to a higher value saves computations without loss of information. The results of initial testing were obtained by setting $t_b$ to m.

Each set of nested contour lines that represent a peak (an individual microstructure) is analyzed separately. The detection method obtains a sequence of contour areas $a_i$ from each set of nested contour lines progressing from the contour line with the highest level of intensity in that set (small area) towards contour lines with low intensity levels (larger areas).

At high intensity levels, if the area enclosed in a contour line is smaller than a given threshold $a_b$, that contour line is ignored. This is equivalent to disregarding any structure that is too small to be a microcalcification in visual interpretation. In accordance with visual inspection, $a_b$ is set to the area of a square with a 0.1 mm side (16 pixels for an image digitized at 25 microns per pixel).

The sequence of contour areas stops when a contour line encloses an area larger than a threshold $a_u$. This is equivalent to disregarding any structure that is too large to be a microcalcification in visual interpretation. In accordance with visual inspection, $a_u$ is set to the area of a square with a 2 mm side (6400 pixels for an image digitized at 25 microns per pixel).

Thus, from each peak, the algorithm obtains an area sequence $a_i$, with i=1, ... N where N is the number of nested contour lines with areas between 16 and 6400 pixels. The algorithm is designed to determine the area growth sequence of an individual peak when other peaks are close, by evaluating the merging pattern of contour lines at consecutive intensity levels.

When the area sequence $a_i$ of a peak becomes available, the detection method computes three measurements (features) from the sequence:

1) Departure (d). In relative terms, the malignant microcalcifications appear sharper than other microstructures of similar size and shape in normal breast tissue. Considering the digitized image as a landscape with peaks and valleys, the sharpness at the perceived edge of a microstructure is a function of the departure of that peak from the surrounding background (surround). A peak that departs abruptly from its surroundings has an abrupt increase in the rate of change (slope) of the sequence $a_i$ as i approaches N. Therefore, the value of d is set to the highest relative increase in the first difference sequence (derivative in discrete sense) of $a_i$ and the corresponding intensity level is labeled as the departure level.

2) Prominence (p). This parameter reflects the relative brightness cue that is used in visual inspection. The prominence has an integer value equal to the number of contour lines above the departure level and it is approximately proportional to the brightness difference between the brightest region of the microstructure and the immediate surround at the level of departure from background.

3) Steepness (s). Generally, normal breast tissue structures appear globally more diffuse than suspicious microcalcifications. Such diffuse structures are represented by peaks that have a gradual increase in height, in the 3-D landscape view of the mammogram (see FIG. 2a), while peaks that correspond to suspicious microcalcifications have a higher overall steepness. Moreover, the peaks of some film artifacts are typically steeper than microcalcification peaks. To obtain the steepness parameter, the detecting method first computes the ratio of change in grey value (e) to change in area, with increasing i at each level up to the departure level and then sets s to the mean of these ratios.

The detection method of the invention detects a microcalcification cluster when three or more peaks that occur in an area of 1 cm² have prominence, steepness and departure values that fall in the corresponding acceptance range.

In testing, the acceptance thresholds were determined with a statistical and automated approach based on more than 500 peaks obtained in two mammograms (training set) and the performance of the algorithm was evaluated on two other mammograms (test set). In each mammogram, both an experienced radiologist and the biopsy examination indicated a cluster of malignant microcalcifications.

In the training mammograms, the distributions of the features p, s, and d were obtained for the populations of peaks within the indicated cluster (detection class) and for the population of peaks in the rest of the mammogram (rejection class) separately. One of the training mammograms is shown in FIG. 1. Acceptance thresholds were determined in order to detect the clusters and reject the remaining microstructures and film artifacts.

Figure 3A:
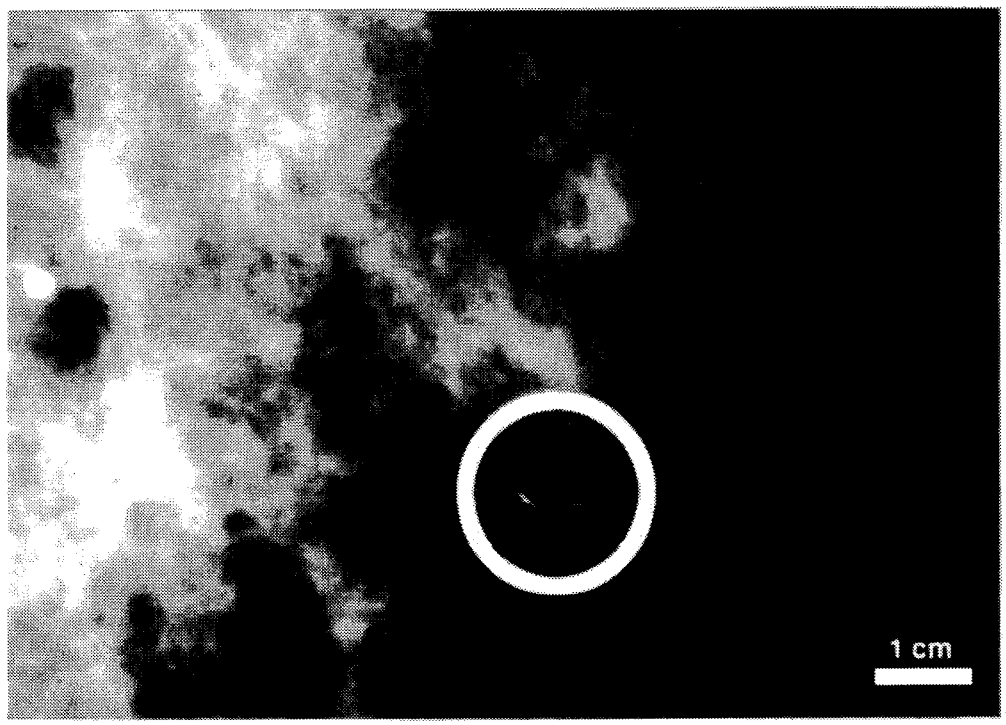
FIG. 3, consisting of FIGS. 3a and 3b, illustrates a microcalcification cluster at two different magnifications for a different mammogram than that shown in FIG. 1.
Figure 3B:
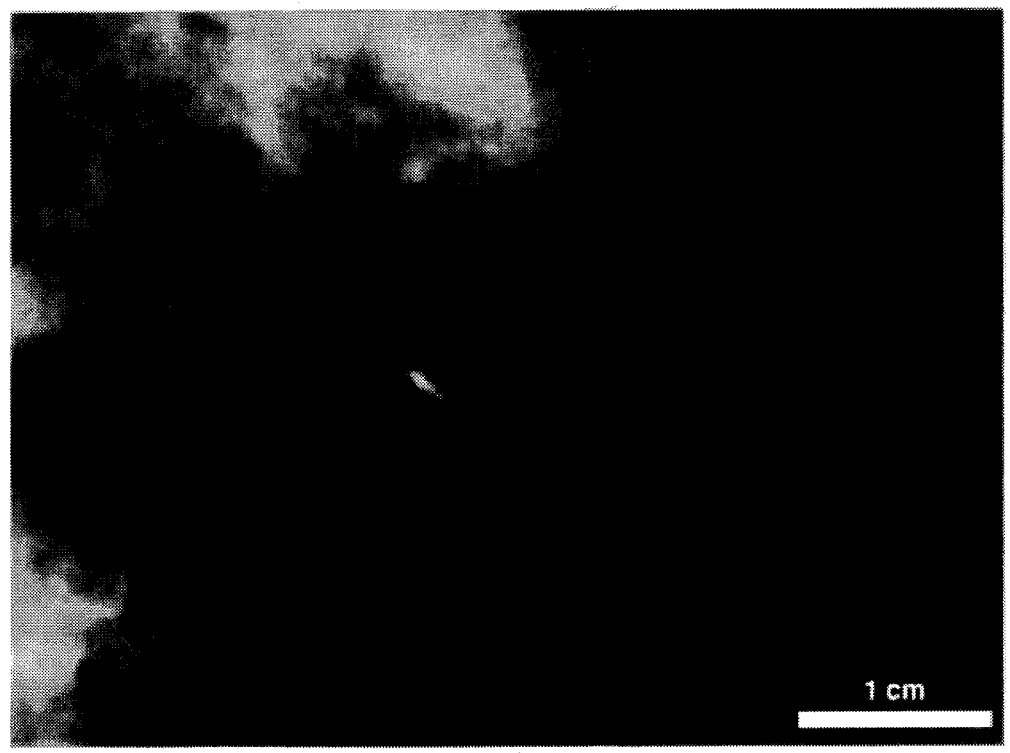

The acceptance thresholds obtained on feature distributions of the training set were used on the two mammograms of the test set without change. One of the test mammograms is shown in FIGS. 3a and 3b. The detection method detected the clusters in the test mammograms and was able to reject other structures and film artifacts in the central parts of the test mammograms. In the image segments that were analyzed in this test, the detection method did not detect a false cluster.

While the discussion above focuses on detection of microcalcification clusters in mammograms, the method of the invention obviously has application to a broader range of image analysis. In fact, the invention can be used to detect objects in many different types of images, e.g., tomographic images.

The invention is a method/system to assist radiologists in determining the location of suspicious clusters. The invention will permit investigation of the subtle signs of early breast cancer that may be overlooked visually. The inherent advantages of an automated detection-system, which include spatial resolution exceeding human vision and-consistent quantitative measurements, will increase the accuracy of mammographic interpretation.

We claim:

1. A method of operating an image interpretation system wherein an object in the image is automatically detected, the method comprising the steps of:

digitizing the image;

inputting the digitized image into a data processing means; detecting automatically the object using the data processing means and the digitized image comprising the steps of:

forming a contour plot of the image, the object in the contour plot comprised of a set of nested contour lines wherein the contour lines correspond to intensity levels thereby causing the object to appear as a peak in relation to the surrounding background in the image;

obtaining a sequence of contour areas from the set of nested contour lines progressing from the contour line having the highest intensity level to the contour line having the lowest intensity level;

computing a feature of the set of nested contour lines using the sequence of contour areas; and detecting the object using the computed feature; and indicating the location of the object in the image.

2. The method as recited in claim 1, wherein the object is a microcalcification.

3. The method as recited in claim 2, wherein the image is a mammogram.

4. The method as recited in claim 3, wherein the mammogram is digitized at a spatial resolution of approximately 25 microns per pixel.

5. The method as recited in claim 1, wherein each contour line is formed of pixels having intensity values equal to or higher than the intensity level of the contour line.

6. The method as recited in claim 5, wherein the computing a feature step comprises the step of computing three features of the set of nested contour lines using the sequence of contour areas.

7. The method as recited in claim 6, wherein the three features are departure, prominence and steepness.

8. The method as recited in claim 6, wherein the object is a cluster of a plurality of microcalcifications.

9. The method as recited in claim 8, wherein the detecting the object step comprises the step of selecting the microcalcification cluster when three or more peaks occur in an area of predetermined size and have values of departure, prominence and steepness that fall in the corresponding acceptance range.

10. The method as recited in claim 9, wherein the area of predetermined size is about 1 cm².

11. The method as recited in claim 5, the forming a contour plot step further comprising the step of determining the highest pixel intensity value of the image, the lowest pixel intensity value of the image, and the mean pixel intensity value of the image.

12. The method as recited in claim 11, wherein the spacing of the levels of intensity of the contour lines is equal and is preset.

13. The method as recited in claim 11, wherein the spacing of the levels of intensity of the contour lines is equal and is set adaptively for each image.

14. The method as recited in claim 13, wherein the spacing is in proportion to the range of the intensity levels of the contour lines.

15. The method as recited in claim 14, wherein the contour line having the largest intensity level is set to equal the highest pixel intensity value of the image minus the spacing and the contour line having the lowest intensity level is set to equal the lowest pixel intensity value of the image.

16. The method as recited in claim 15, wherein the contour line having the lowest intensity level is set to equal the mean pixel intensity value of the image.

17. The method as recited in claim 5, wherein a contour line is ignored if the area enclosed by the contour is smaller than a first threshold.

18. The method as recited in claim 17, wherein the first threshold is set to the area of a square about 0.1 mm on a side.

19. The method as recited in claim 5, wherein the sequence stops at a contour line enclosing an area larger than a second threshold.

20. The method as recited in claim 19, wherein the second threshold is set to the area of a square about 2 mm on a side.

21. The method as recited in claim 5, wherein the computing a feature step comprises the step of computing a value for the departure of the peak from the surrounding background in the image by computing the rate of change of the sequence of contour areas as the sequence approaches the contour line having the lowest intensity level.

22. The method as recited in claim 21, wherein the departure value is set to the highest relative increase in the first difference sequence of contour areas and the corresponding intensity level is the departure level.

23. The method as recited in claim 5, wherein the computing a feature step comprises the step of computing a prominence of the peak, the prominence being an integer equal to the number of contour lines above the departure level.

24. The method as recited in claim 5, wherein the computing a feature step comprises the step of computing a steepness of the peak.

25. The method as recited in claim 24, wherein the steepness computing step comprises the steps of:

computing a ratio of change in grey value to change in area with increasing contour lines at each level above the departure level; and setting the steepness to the mean of the ratios.

26. A method of operating a mammogram interpretation system wherein a microcalcification in the mammogram is automatically detected, the method comprising the steps of:

digitizing the mammogram;

inputting the digitized mammogram into a data processing means;

detecting automatically the microcalcification using the data processing means and the digitized mammogram comprising the steps of:

forming a contour plot of the mammogram, the microcalcification in the contour plot comprised of a set of nested contour lines wherein each contour line is formed of pixels having intensity values equal to or higher than the intensity level of the contour line thereby causing the microcalcification to appear as a prominent peak in relation to the surrounding background in the mammogram;

obtaining a sequence of contour areas from the set of nested contour lines progressing from the contour line having the highest intensity level to the contour line having the lowest intensity level;

computing a value for the departure of the peak from the surrounding background in the mammogram by computing the rate of change of the sequence of contour areas as the sequence approaches the contour line having the lowest intensity level, wherein the departure value is set to the highest relative increase in the first difference sequence of contour areas and the corresponding intensity level is the departure level;

computing the prominence of the peak, the prominence being an integer equal to the number of contour lines above the departure level;

computing the steepness of the peak comprising the steps of:

computing a ratio of change in grey value to change in area with increasing contour lines at each level above the departure level; and setting the steepness to the mean of the ratios; and detecting a microcalcification cluster of three microcalcifications when three or more peaks occur in an area of about 1 $cm^2$ and have values of departure, prominence and steepness that fall in the corresponding acceptance range; and indicating the location of the microcalcification cluster in the mammogram.

27. An image interpretation system wherein an object in the image is automatically detected, the system comprising:

means for digitizing the image;

a data processing means for receiving the digitized image;

means for automatically detecting the object using the data processing means and the digitized image, the automatic detection means comprising:

means for forming a contour plot of the image, the object in the contour plot comprised of a set of nested contour lines wherein the contour lines correspond to intensity levels thereby causing the object to appear as a peak in relation to the surrounding background in the image;

means for obtaining a sequence of contour areas from the set of nested contour lines progressing from the contour line having the highest intensity level to the contour line having the lowest intensity level;

means for computing a feature of the set of nested contour lines using the sequence of contour areas; and means for detecting the object using the computed feature; and means for indicating the location of the object in the image.

28. The system as recited in claim 27, wherein the object is a microcalcification.

29. The system as recited in claim 28, wherein the image is a mammogram.

30. The system as recited in claim 27, wherein each contour line is formed of pixels having intensity values equal to or higher than the intensity level of the contour line.

31. The method as recited in claim 30, wherein the computing a feature means comprises means for computing three features of the set of nested contour lines using the sequence of contour areas.

32. The system as recited in claim 31, wherein the three features are departure, prominence and steepness.

33. The system as recited in claim 32, wherein the object is a cluster of a plurality of microcalcifications.

34. The system as recited in claim 33, wherein the detecting means comprises means for selecting the microcalcification cluster when three or more peaks occur in an area of about 1 $cm^2$ and have values of departure, prominence and steepness that fall in the corresponding acceptance range.

35. An mammogram interpretation system wherein a microcalcification in the mammogram is automatically detected, the system comprising:

means for digitizing the mammogram;

a data processing means for receiving the digitized mammogram;

means for automatically detecting the microcalcification using the data processing means and the digitized mammogram, the automatic detection means comprising:

means for forming a contour plot of the mammogram, the microcalcification in the contour plot comprised of a set of nested contour lines wherein each contour line is formed of pixels having intensity values equal to or higher than the intensity level of the contour line thereby causing the microcalcification to appear as a prominent peak in relation to the surrounding background in the mammogram;

means for obtaining a sequence of contour areas from the set of nested contour lines progressing from the contour line having the highest intensity level to the contour line having the lowest intensity level;

means for computing a value for the departure of the peak from the surrounding background in the mammogram by computing the rate of change of the sequence of contour areas as the sequence approaches the contour line having the lowest intensity level, wherein the departure value is set to the highest relative increase in the first difference sequence of contour areas and the corresponding intensity level in the departure level;

means for computing the prominence of the peak, the prominence being an integer equal to the number of contour lines above the departure level;

means for computing the steepness of the peak comprising:
    means for computing a ratio of change in grey value to change in area with increasing contour lines at each level above the departure level; and
    means for setting the steepness to the mean of the ratios; and means for detecting a microcalcification cluster of three microcalcifications when three or more peaks occur in an area of about 1 $cm^2$ and have values of departure, prominence and steepness that fall in the corresponding acceptance range; and means for indicating the location of the microcalcification cluster in the mammogram.

\* \* \* \* \*

UNITED STATES PATENT AND TRADEMARK OFFICE
CERTIFICATE OF CORRECTION

PATENT NO. : 5,574,799
DATED : November 12, 1996
INVENTOR(S) : Isaac N. Bankman, et. al.

It is certified that error appears in the above-indentified patent and that said Letters Patent is hereby corrected as shown below:

Column 6, line 24, delete "6" and substitute therefor
-- 7 --.

Signed and Sealed this

Eleventh Day of February, 1997

Attest:

BRUCE LEHMAN

Attesting Officer

Commissioner of Patents and Trademarks